United States Patent [19]
Lissy et al.

[11] Patent Number: 6,143,261
[45] Date of Patent: Nov. 7, 2000

[54] CATALYTIC REDUCTION OF NITROGEN OXIDE EMISSIONS WITH MCM-49 AND MCM-56

[75] Inventors: Daria N. Lissy, Glen Mills, Pa.; David O. Marler, Deptford, N.J.; John P. McWilliams, Woodbury, N.J.; David S. Shihabi, Voorhees, N.J.; Sanjay B. Sharma, Burr Ridge, Ill.

[73] Assignee: Exxon Research and Engineering Company, Florham Park, N.J.

[21] Appl. No.: 08/990,459

[22] Filed: Dec. 15, 1997

[51] Int. Cl.$^7$ ..................................................... C01B 21/00
[52] U.S. Cl. .................. 423/213.5; 423/212; 423/213.2; 423/239.1; 423/239.2
[58] Field of Search ................................ 423/212, 213.2, 423/235, 239.1, 239.2; 502/60, 64, 66, 74, 77

[56] References Cited

U.S. PATENT DOCUMENTS

| | | | |
|---|---|---|---|
| 5,254,322 | 10/1993 | Bhore et al. | 423/239.2 |
| 5,552,129 | 9/1996 | Farnos et al. | 423/239.2 |
| 5,589,147 | 12/1996 | Farnos et al. | 423/239.2 |

*Primary Examiner*—Tom Dunn

[57] ABSTRACT

MCM-56 and MCM-49 have been demonstrated to be effective catalysts for the reduction of nitrogen oxide ($NO_x$) emissions in a net oxidizing environment such as Selective Catalytic Reduction or lean burn engine exhaust applications. MCM-56 and MCM-49 can be utilized as a component of a spherical or cylindrical catalyst particle or as a wash coat on a ceramic or metallic monolith. Optionally, a transition metal such as copper, can be added to the catalyst for improved activity.

7 Claims, No Drawings

5,143,261

CATALYTIC REDUCTION OF NITROGEN OXIDE EMISSIONS WITH MCM-49 AND MCM-56

CROSS-REFERENCE TO RELATED APPLICATION

This application is related to Ser. No. 08/133,943, filed Oct. 12, 1993, now abandoned.

FIELD OF THE INVENTION

This invention is concerned with the abatement of nitrogen oxides and optionally, other undesirable compounds, in industrial and engine exhaust gases. In particular, it is concerned with a catalytic method of efficiently eliminating these undesirable compounds before discharge to the atmosphere. It is more particularly concerned with the preparation and use of a specially prepared catalyst comprising MCM-56 or MCM-49. MCM-56 and MCM-49 have been shown to be effective catalysts for the reduction of nitrogen oxide emissions in a net oxidizing environment such as Selective Catalytic Reduction and lean burn exhaust applications.

BACKGROUND OF THE INVENTION

Nitrogen oxide ($NO_x$) emission control has been the focus of recent legislative initiatives in the United States, Canada, Europe and the Pacific Rim region. In addition to being a primary precursor of acid rain, $NO_x$ plays a minor role in ozone pollution. One-third of all man-made $NO_x$ emissions in the U.S. in 1985 were from automobiles, according to the EPA Publication, "Anthropogenic Emission Data for the 1985 NAPAP Inventory" (EPA600/788022). In the early 1980's the automotive industry started adding rhodium to their exhaust catalysts to aid in the reduction of $NO_x$ emissions. Engines were controlled to operate at the stoichiometrically balanced air-to-fuel ratio, A/F=14.4–14.7, because at this ratio three-way (Pt—Rh) catalysts simultaneously promote the conversion of the three primary exhaust pollutants: CO, hydrocarbons, and $NO_x$. Recently, automobile manufacturers have developed lean-burn spark-ignition engines which operate at A/F/ratios of 18–23 because they are more fuel-efficient, have longer life, and produce fewer pollutants than stoichiometric burn engines. The exhaust from lean-burn engines is oxygen-rich and contains lower levels of hydrocarbons and carbon monoxide. The implementation of lean-burn engines is limited by the inability of the three-way catalyst to remove $NO_x$ from the oxygen-rich exhaust. Furthermore, legislation is being proposed to limit $NO_x$ emissions from diesel engines (e.g. automotive, construction, farm and marine) which are also lean-burn engines.

The largest single source of $NO_x$ emissions, approximately 50% of the total, is burners and stationary engines in utility and industrial complexes, according to the EPA. Legislative mandates have lowered the permitted levels for these $NO_x$ emissions to a point where Selective Catalytic Reduction (SCR) units are increasingly being required to meet $NO_x$ emission specifications. The standard catalysts for SCR applications are based on vanadium with a titanium oxide matrix, supported on various types of monoliths. There is growing concern in the petroleum refining community about the long term viability of this type of catalyst due to its restricted window of temperature operability and disposal problems due to the metals.

In response to these challenges, a large amount of research has been carried out, inside academia and industry, on alternate catalyst systems for SCR and oxygen-rich engine exhaust (lean burn gasoline and diesel) applications. A large portion of this work has focused on the potential of zeolites.

The so-called "stable" nitrogen oxides have in common the somewhat peculiar property that although they are thermodynamically unstable with respect to decomposition into elemental oxygen and nitrogen, no simple, economical method has been described for inducing this decomposition. It has been discovered, however, that the addition of a reductant such as ammonia or an ammonia precursor to the exhaust gas, under appropriate reaction conditions, converts $NO_x$ to elemental nitrogen and steam and denitrifies the exhaust gas.

The process of contacting an industrial flue gas with a catalyst in the presence of ammonia at a temperature in the range of about 200°–600° C. to denitrify the flue gas has come to be known as the process for Selective Catalytic Reduction (SCR) of $NO_x$. In order to avoid confusion, any reference made herein to "Selective Catalytic Reduction," or to "SCR," is intended to refer to a process in which a mixture of $NO_x$ and $NH_3$ are induced to react catalytically at elevated temperatures. The term "denitrify" as used herein, means to reduce the amount of one or more noxious nitrogen compounds (such as NO, $NO_x$ and HCN) contained in a waste gas, preferably by conversion to nitrogen gas. SCR is more particularly described in U.S. Pat. No. 5,589,147.

U.S. Pat. No. 5,589,147, herein incorporated by reference, discloses a process for Selective Catalytic Reduction of $NO_x$ in exhaust gas. $NO_x$ is reduced over a catalyst composition comprising a molecular sieve that has been treated with a metal in a in a way effective to maximize metal dispersion. The catalyst of this invention typically comprises a silica, titania, or zirconia binder.

U.S. Pat. No. 5,552,129 discloses an SCR process which employs a catalyst composition comprising a metal and an in-situ crystallized zeolite such as ZSM-5.

U.S. Pat. No. 5,254,322 is concerned with a method for reduction of nitrogen oxides contained in a gaseous stream such as lean burning internal combustion engine exhaust. The method employs a hydrothermally stable catalyst comprising transition metal-containing ZSM-5 which is prepared by in-situ crystallization of a preformed aggregate.

U.S. Pat. No. 5,254,322 discloses that nitrogen oxides contained in an exhaust gas from an internal combustion engine operating under lean burn conditions can be reduced by contacting the exhaust gas at a temperature of at least 300° C. with a hydrothermally stable catalyst comprising a transition metal and a zeolite having the structure of ZSM-5 which is prepared by in-situ crystallization of an aggregate comprising ZSM-5 seeds, silica, and a crystalline silicate. The exhaust gas has a molar ratio of hydrocarbons to nitrogen oxides of at least the stoichiometric ratio, and the reduction of $NO_x$ is substantially effected by hydrocarbon reductant. It has been found that the catalysts employed in this invention are more heat and/or steam stable in this particular use than corresponding zeolite-containing catalysts prepared by other methods which enhance thermal and/or hydrothermal stability.

SUMMARY OF THE INVENTION

It has been demonstrated that MCM-49 and MCM-56 are active for the reduction of $NO_x$ emissions. The MCM-49 or MCM-56 can be utilized as a component of a spherical or cylindrical catalyst particle or as a wash coat on a ceramic or metallic monolith.

A transition metal component, such as copper, is preferred for $NO_x$ reduction applications. Other potential metals include zinc, vanadium, chromium, manganese, iron, cobalt, nickel, rhodium, palladium, platinum, and molybdenum. In addition to the transition metal, alkali or alkaline earth metals may be present in the catalyst to facilitate $NO_x$ reduction. Such metals include alkaline earth metals, sodium, potassium, rubidium, cesium, magnesium, calcium and barium. Furthermore, a steam stabilizing amount of titanium, zirconium, or rare earth can be included in the catalyst formulation.

This invention provides a novel class of additive catalysts which are effective for the reduction of $NO_x$ and carbon monoxide emissions in a net oxidizing environment such as Selective Catalytic Reduction (SCR) or lean-burn engine exhaust. The present invention provides a method for reducing $NO_x$ emissions from an exhaust gas comprising the steps of:

(a) mixing added ammonia or an ammonia-producing precursor with said exhaust gas at a temperature of at least about 200° C. in an amount sufficient to satisfy the stoichiometric requirement for decreasing the $NO_x$ content of said exhaust gas by reaction with ammonia;

(b) contacting the withdrawn exhaust gas with MCM-49 or MCM-56 under net oxidizing conditions to reduce the $NO_x$ content of the exhaust gas. Both are synthetic porous crystalline materials. MCM-49 or MCM-56 may contain a transition metal or transition metal cations. In a preferred embodiment, the transition metal or transition metal cation comprises copper or a copper cation. MCM-49 is more particularly described in U.S. Pat. No. 5,236,575, which is incorporated by reference. MCM-56 is more particularly described in U.S. Pat. No. 5,362,697 which is incorporated by reference.

The present invention further provides a method for reducing $NO_x$ emissions from a lean-burn engine exhaust comprising the steps of:

(a) operating a lean-burn internal combustion engine at an air-to-fuel ratio above stoichiometric;

(b) controlling the composition of the lean-burn engine exhaust gas to satisfy the stoichiometric requirement for reducing $NO_x$ by reaction with at least one compound selected from the group consisting of ammonia, an ammonia-forming precursor, or a hydrocarbon;

(c) contacting the mixture of step (b) with MCM-49 or MCM-56 under net oxidizing conditions to reduce the $NO_x$ content of the exhaust gas. The MCM-49 or MCM-56 contains a transition metal preferably copper) or a transition metal cation (preferably a copper cation). The process may optionally include mixing added hydrocarbon, ammonia, or an ammonia-forming precursor with said exhaust gas, and if ammonia or an ammonia-forming precursor is used, this mixing step is preferably carried out at a temperature of at least about 200° C.

DETAILED DESCRIPTION

The terms "industrial exhaust gas" or "exhaust gas" as used herein encompass any waste gas which is formed in an industrial process or in an internal combustion engine. Examples of lean-burn internal combustion engines include spark ignition engines and diesel engines. The term "lean burn engine" as used herein refers to an internal combustion engine which operates under A/F (air-to-fuel) ratios of from about 18:1 to about 23:1. Lean-burn spark-ignition engines operate more efficiently, last longer, and produce fewer pollutants than stoichiometric burn spark-ignition engines. The oxygen-rich exhaust from lean-burn engines contains lower levels of hydrocarbons and carbon monoxide than the exhaust from conventional spark-ignition engines.

The composition of exhaust gas varies, depending upon the particular process which generates the exhaust gas. For example, the combustion of fossil fuels produces exhaust gas containing nitrogen, steam, and carbon dioxide in addition to low levels (e.g. 1000 ppm total) of nitric oxide and nitrogen dioxide. Lean-burn engines may, under certain operating conditions, produce an exhaust gas containing enough unburned hydrocarbon (which acts as a reductant in the present process) that no added reductant is needed to reduce the $NO_x$. If additional reductant is needed, ammonia, an ammonia-forming precursor, or additional hydrocarbon may be mixed with the exhaust gas. Sulfur-containing fuels, including certain grades of coal and unrefined or slightly refined heavy distillates and petroleum residua, produce an exhaust gas that contains some $SO_2$. Rich fuel/air mixtures will generally produce an exhaust gas that contains little if any free oxygen, and some carbon monoxide. Lean fuel/air mixtures, i.e. mixtures in which more air is provided than is stoichiometrically required to completely combust the fuel, will form an exhaust gas that contains gaseous oxygen. Lean-burn internal combustion engines produce such an exhaust gas.

Other industrial processes such as nitration, uranium recovery, and calcining nitrate salt-containing solids produce exhaust gases which can have compositions different from those noted above. They may be substantially devoid of steam, for example, and may contain very high concentrations of nitrogen or other inert gases.

For treating industrial exhaust, the process of this invention typically requires that the $NO_x$-contaminated exhaust gas be mixed with gaseous ammonia or an ammonia-forming precursor such as urea. This mixing step is preferably carried out at a temperature of at least about 200° C. if the reducing agent is gaseous ammonia. This temperature limitation is necessary to avoid the formation of solid ammonium nitrite or nitrate, which is potentially hazardous. The amount of ammonia (or ammonia-forming precursor such as urea) included in the mixture should be approximately the amount required to stoichiometrically react with the $NO_x$ present in the exhaust gases. U.S. Pat. No. 4,778,665 to Krishnamurthy et al. discloses a proposed mechanism for an SCR reaction and teaches the appropriate ammonia dosage for the SCR reaction. The '665 Krishnamurthy et al. patent is incorporated by reference as if set forth at length herein for details of ammonia addition to an SCR process.

As used herein, the term "approximate stoichiometric amount of ammonia" is intended to mean about 0.75 to about 1.25 of the molar amount of ammonia by equations (1) and (2) at column 2 of the '665 Krishnamurthy et al. patent.

For lean-burn engine exhaust, on the other hand, the necessary reductants are typically contained in the exhaust stream as light hydrocarbons, but may optionally be introduced separately if necessary. The $NO_x$ reduction process of the invention is typically carried out under conditions as set forth below.

Conversion Conditions For Decreasing Nitrogen
Oxide Content of a Waste Gas Stream

|  | Stream | | |
| --- | --- | --- | --- |
|  | Useful | Typical | Preferred |
| Temperature, °C. | 200 to 700 | 250 to 600 | 275 to 550 |
| Pressure | Sufficient to maintain flow across reaction zone | Approximately atmospheric | Slightly above atmospheric |
| GHSV, hr.$^{-1}$ | 5 to 300,000 | 10 to 200,000 | 200 to 100,000 |

The embodiments of the present $NO_x$ abatement process which include mixing ammonia ($NH_3$), or an ammonia-producing precursor such as urea, with the nitrogen-containing waste gas typically require a $NH_3$:$NO_x$ molar ratio of from about 0.1:1 to about 10:1, preferably from about 0.1:1 to about 1.5:1, more preferably from about 0.5:1 to about 1.1:1. For a discussion of conversion conditions which are useful in conventional SCR processes (which process conditions are also useful, albeit not preferred, in the present inventive process) see U.S. Pat. Nos. 4,695,438 and 4,798,817 to Becker and Jung, which are incorporated by reference as if set forth at length herein.

The $NO_x$ reduction process of the present invention may be carried out in a fixed catalyst bed. While the reaction is exothermic, the $NO_x$ in the exhaust gas is generally sufficiently diluted that reaction temperature may readily be controlled in the fixed bed using convention means. However, other contacting means may also be used, including a fixed fluid bed, a transport bed, and a monolithic catalyst structure such as a honeycomb. The process of this invention is operable over a wide range of pressures from subatmospheric to superatmospheric, e.g., 5 to 500 psia, preferably 10 to 50 psia, as more generally described above in the table. The process is most typically operated at approximately atmospheric pressure.

The method of the present invention is also useful for treating the flue gas generated by a fluid catalytic cracking (FCC) process unit. The FCC flue gas is typically available at about 700° C., and temperatures in this range are compatible with the present process. In contrast, conventional SCR catalysts, such as V/$TiO_2$, operate optimally at lower temperatures, e.g., 375° C. Thus the present process requires no waste gas cooling step to effectively process hot FCC regenerator flue gas.

Coupling the flue gas outlet of an FCC regenerator with a conventional SCR process has, in the past, raised the concern that conventional SCR catalyst (e.g., V/$TiO_2$ SCR catalyst which promotes oxidation) could experience dangerous thermal runaway if an operational upset in the FCC regenerator slugged unburned hydrocarbons into the FCC regenerator flue gas stream, and subsequently to the SCR process. In contrast, the catalysts useful in the process of this invention are not oxidation catalysts, and therefore any thermal excursion caused by hydrocarbon slugging would be markedly less severe than with a conventional V/$TiO_2$ SCR catalyst.

Generally, the catalyst of the present invention contains at least one transition metal. Preferred transition metals include those selected from the group consisting of copper, zinc, vanadium, chromium, manganese, iron, cobalt, nickel, rhodium, palladium, platinum, and molybdenum. Copper is especially preferred.

In addition to the transition metal, alkali or alkaline earth metals may be present in the catalyst in order to facilitate $NO_x$ reduction. Such metals include Na, K, Rb, Cs, Mg, Ca, and Ba.

The catalysts of the present invention are prepared by introducing transition metal or transition metal ions into the framework of the synthetic porous material, in this case MCM-49 or MCM-56, or within the pores of the material by any suitable technique. MCM-49 or MCM-56 can be ion-exchanged, ion-doped, or loaded sufficiently so as to provide an efficient amount of catalytic metal within or on the material. Alternatively, the metals or metal ions can be introduced to a support, or to both the synthetic porous material and the support. Synthesis of MCM-49 is more particularly described in U.S. Pat. No. 5,236,575. MCM-58 is more particularly described in U.S. Pat. No. 5,362,697.

Catalyst Preparation

For purposes of preparing the catalyst of the present invention, the synthetic porous material, MCM-49 or MCM-56, may be used as such or, alternatively, may be incorporated in a binder (matrix) such as silica, silica-alumina, alumina, clay or other known inorganic binder, and used in this form as the starting material for the formulation of the catalyst. Regardless of whether the material is in pure form or incorporated in a matrix, it is preferred that it be in the hydrogen, ammonium, or alkali form prior to loading with metals as described below.

MCM-49 or MCM-56 is preferably composited with another material which is resistant to the temperatures and other conditions encountered in the $NO_x$ reduction process of this invention. Such compositing also improves the crush strength of the catalyst under these conditions. These materials function as binders or matrices for the catalyst. Such materials typically include active and inactive materials and synthetic or naturally occurring zeolites as well as inorganic materials such as clays and/or oxides such as alumina, silica or silica-alumina. The latter may be either naturally occurring or in the form of gelatinous precipitates or gels including mixtures of silica and metal oxides. Use of a material in conjunction with MCM-49 or MCM-56, i.e., combined with it or present during its synthesis, which itself is catalytically active may change the conversion and/or selectivity of the catalyst. Inactive materials suitably serve as diluents to control the amount of conversion. The relative proportions of finely divided crystalline material (MCM-56 or MCM-49) and matrix may vary widely, with the crystal content ranging from about 1 to about 90 percent by weight and more usually, particularly when the composite is prepared in the form of beads, in the range of about 2 to about 80 weight percent of the composite.

The synthetic porous material can be composited into a wide variety of particle shapes and sizes for the finished catalyst. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded such as by extrusion, the crystals of the synthetic porous material can be extruded before drying or partially dried and then extruded with binder. They are commonly extruded into spherical or cylindrical shapes. The catalyst may also be formed into a monolithic honeycomb structure as taught in U.S. Pat. No. 4,157,375 to Brown et al., which patent is incorporated by reference as if set forth at length herein.

Transition Metal and Stabilizing Components

The transition metal may be introduced into the crystalline material by the use of any soluble transition metal salt, preferably one which provides transition metal cations. Copper is a preferred transition metal, and cupric acetate and cupric nitrate are useful for this purpose, but cupric chloride and cupric sulfate also may be used. Ion-exchange techniques, as shown in the examples, provide catalytically effective amounts of transition metal. However, effective loading is also obtained when the transition metal is introduced by impregnation of the synthetic porous material with an aqueous solution of the transition metal salt. The amount of transition metal is generally in the range of 1 to 10 percent by weight of the catalyst, more usually in the range of about 2 to 5 weight percent, based on the entire weight of the catalyst.

In a preferred embodiment for making the catalyst, a steam stabilizing amount of titanium or zirconium cations or a mixture of these metal compounds is included in the additive by treatment of MCM-49 or MCM-56 with any titanium or zirconium compound that can be brought into intimate association with it. Highly effective results are obtained with the use of aqueous solutions of titanium tetramethoxide and zirconium acetate, and, such materials being readily available, are preferred. The introduction of titanium or zirconium compound is effective when done by impregnation. The introduction of titanium or zirconium may follow ion-exchange by cupric ion, but it also may be done concurrently therewith with an aqueous solution containing, for example, both divalent copper cations and a soluble titanium or soluble zirconium compound. It is also possible to load MCM-49 or MCM-56 with titanium or zirconium compound prior to introduction of copper. An amount of the stabilizing metal equal to 1 to 20 weight percent, more usually from about 2 to 10 weight percent, of the total additive is effective.

In general, it is preferred to add the copper by impregnation of the matrix-bound MCM-56 or MCM-49 with an aqueous solution containing the copper ions. This step may be followed by drying and calcining at about 350° C. for about 1–10 hours. Alternative procedures may be evaluated by simple testing, and used if advantageous.

In the particularly preferred embodiment of this invention, MCM-56 or MCM-49 is combined with a matrix or binder consisting predominantly of a source of titania, zirconia, silica or a mixture of two or more of titania, zirconia, or silica sources, and shaped to provide particles of the desired size. Suitable sources of titania include, for example, titanium dioxide (e.g. Anatase), hydrated titanium dioxide, and metatitanic acid. MCM-56 or MCM-49 may be mulled with the titania, zirconia or a precursor of either (or both) which is converted to the oxide during the subsequent processing e.g. during calcination, followed by extrusion or spray-drying. The resultant shaped particles may then be calcined to provide a composition containing about 10 to about 90 parts of MCM-56 or MCM-49 and 90 to 10 parts by weight of titania or zirconia matrix. Other means for preparing of synthetic porous crystalline materials in a titania matrix are disclosed in U.S. Pat. No. 4,793,813 to Kato et al., to which reference is made for a disclosure of these techniques. The calcined shaped particles are then treated by ion-exchange or impregnation with a source of copper ions and rare earth ions, these preferably being in aqueous solution as the chloride, nitrate or acetate salts, followed by calcination to prepare the catalyst additive.

The catalyst may be stabilized by the addition of one or more rare earth compounds, preferably derived from cerium or yttrium, although a wide variety of rare earth compounds can be employed as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like. The only limitation on the particular rare earth metal salt or salts employed is that it be sufficiently soluble in the fluid medium in which it is used to enter the catalyst, preferably by a process of ion transfer although impregnation is also suitable. The preferred rare earth salts are chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available. One such solution contains the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. Other mixtures of rare earths are also applicable for the preparation of the catalyst, although lanthanum, neodymium, praseodymium, samarium and gadolinium as well as mixtures of rare earth cations containing a predominant amount of one or more of the above cations are preferred.

In general, the amount of rare earth, calculated as the metal, will be from about 0.1 to 10.0, preferably from about 1 to about 10 weight percent of the total additive, to provide a significant and measurable increase in steam stability without substantial loss of catalytic activity of the unsteamed sample. Although it is difficult to specify the exact rare earth content needed for the desired effect, a few simple laboratory tests can determine said amount regardless of the zeolite chosen, or of the particular rare earth or mixture thereof used.

The rare earth stabilizers are preferably added in the same way as the transition metal, that is, by impregnation of the matrix-bound MCM-56 or MCM-49 with an aqueous solution containing the rare earth ions, preferably simultaneously with the transition metal ions. This step may be followed by drying and calcining at about 500° C. for about 1–10 hours. Alternative procedures may be evaluated by simple testing, and used if advantageous.

As a final step in preparation of the transition metal additive, the dried catalyst is usually calcined in air or nitrogen for about 1–4 hours to decompose organic matter and fix the binder in the composition as an inorganic compound. Suitable calcination temperatures are 350° to about 750° C.

Further description of useful shapes of the catalyst and their application is found in U.S. Pat. No. 4,798,813 to Kato et al. to which reference is made for a description of such shapes.

Data and Other Pertinent Information

EXAMPLE 1

MCM-49 was prepared per Example 8 of U.S. Pat. No. 5,236,575. A portion of the MCM-49 crystals was dried then calcined in nitrogen for 3 hours at 538° C., exchanged with aqueous ammonium nitrate, washed with DI H2O, dried at 120° C., and calcined in air for 6 hours at 538° C. Select properties of this material are listed in Table 1.

EXAMPLE 2

MCM-56 was prepared by adding 2.24 parts of 45% sodium aluminate solution to a mixture of 1.0 parts 50% NaOH and 43.0 parts of $H_2$) in an autoclave. 8.75 parts of Ultrasil precipitated silica were added with agitation, followed by 4.51 parts of HMI, hexamethyleneimine. The reaction mixture had the following composition in mole ratios:

| | |
|---|---|
| $SiO_2/Al_2O_3$ | 23 |
| OH—/$SiO_2$ | 0.21 |
| R/$SiO_2$ | 0.35 |
| $H_2O/SiO_2$ | 19.3 |

The mixture was crystallized at 149° C. for 27 hours with stirring. The chemical composition of the product was, in wt %:

| | |
|---|---|
| N | 1.22 |
| Na | 2.9 |
| $Al_2O_3$ | 5.7 |
| Ash | 67.3 |
| $SiO_2/Al_2O_3$ Mole Ratio | 18.1 |

A portion of dried MCM-56 crystals was then exchanged with an aqueous solution of ammonium nitrate, washed with DI water, and dried at 250° F. The zeolite was activated by calcining for 3 hours at 1000° F. in 5 v/v/min nitrogen followed by 6 hours in air at 1000° F. The properties of this material are listed in Table 1.

TABLE 1

Properties of MCM-49 and MCM-56

| | MCM-49 Example 1 | MCM-56 Example 2 |
|---|---|---|
| $SiO_2/Al_2O_3$ | 18 | 17 |
| Na, ppm | 56 | 1460 |
| Sorptions, wt % | | |
| $H_2O$ | 16.9 | 17.6 |
| Cyclohexane | 9.5 | 18.3 |
| n-Hexane | 13.5 | 16.5 |

EXAMPLES 3–4

A 2.75 g sample, 40/80 mesh, of hydrogen form MCM-49 (9.0 cc) or MCM-56 (17.5 cc) is loaded into a quartz reactor. A simulated gas stream, Table 2, is introduced to the reactor at a rate of 1,000 cc/min and the temperature ramped in intervals from 250° C. to 550° C. and the $NO_x$ conversion levels determined at each temperature.

TABLE 2

Test Gas Composition

| | |
|---|---|
| Nitric Oxide, ppmv | 500 |
| Ammonia, ppmv | 500 |
| Oxygen, vol % | 5 |
| Helium, vol % | Balance |

Table 3 contains the results of these evaluations. From this data it can be seen that both catalysts are active for deNOx activity with the MCM-49 sample being ~100° C. more active than the MCM-56.

TABLE 3

$NO_x$ Abatement Activity

| | NOx Conversion, % | |
|---|---|---|
| Temperature, ° C. | MCM-49 6667 GHSV | MCM-56 3429 GHSV |
| 250 | 74 | 38 |
| 345 | 98 | 80 |
| 400 | 97 | 77 |
| 455 | 93 | 75 |
| 550 | 87 | 68 |

What is claimed is:

1. A process for reducing $NO_x$ emissions from an exhaust gas comprising the steps of:
   (a) mixing added ammonia or an ammonia-forming precursor with said exhaust gas at a temperature of at least about 200° C. in an amount sufficient to satisfy the stoichiometric requirement for reducing $NO_x$ to elemental nitrogen and steam by reaction with ammonia;
   (b) contacting said exhaust gas with a synthetic porous crystalline material of MCM-56 containing a transition metal or transition metal cation under net oxidizing conditions to reduce the $NO_x$ content of said exhaust gas.

2. The process of claim 1 wherein said transition metal is selected from the group consisting of copper, zinc, vanadium, chromium, manganese, iron, cobalt, nickel, rhodium, palladium, platinum, and molybdenum.

3. The process of claim 2 in which the crystalline material includes copper metal or copper metal cations in an amount equivalent to at least one half mole of CuO for each mole of $Al_2O_3$ in the crystalline material.

4. A process for reducing $NO_x$ emissions from an exhaust gas comprising the steps of:
   (a) generating an exhaust gas containing $NO_x$ and an amount of hydrocarbon sufficient to satisfy the stoichiometric requirement for reducing $NO_x$ to elemental nitrogen and steam by reaction with said hydrocarbon;
   (b) contacting said exhaust gas of step (a) with a synthetic porous crystalline material of MCM-56 under net oxidizing conditions to reduce the $NO_x$ content of said exhaust gas.

5. The process of claim 4 wherein the crystalline material includes transition metal selected from the group consisting of copper, zinc, vanadium, chromium, manganese, iron, cobalt, nickel, rhodium, palladium, platinum, and molybdenum.

6. The process of claim 5 in which the the crystalline material includes copper metal or copper metal cations in an amount equivalent to at least one half mole of CuO for each mole of $Al_2O_3$ in the crystalline material.

7. A process for reducing $NO_x$ emissions from a lean-burn engine exhaust comprising the steps of:

(a) operating an internal combustion engine at an air-to-fuel ratio above stoichiometric;

(b) supplying reductant in said internal combustion engine exhaust at an amount sufficient to satisfy the stoichiometric requirement for reacting $NO_x$ with said reductant and reducing $NO_x$ to elemental nitrogen and steam wherein said reductant is selected from the group consisting of ammonia, an ammonia-forming precursor, and a hydrocarbon;

(c) contacting said mixture of step (b) with a synthetic porous crystalline material of MCM-56 containing transition metal or transition metal cations under net oxidizing conditions to reduce the $NO_x$ content of said engine exhaust.

* * * * *